March 8, 1932. A. A. THOMAS 1,848,851
VEHICLE BUMPER
Original Filed April 12, 1930
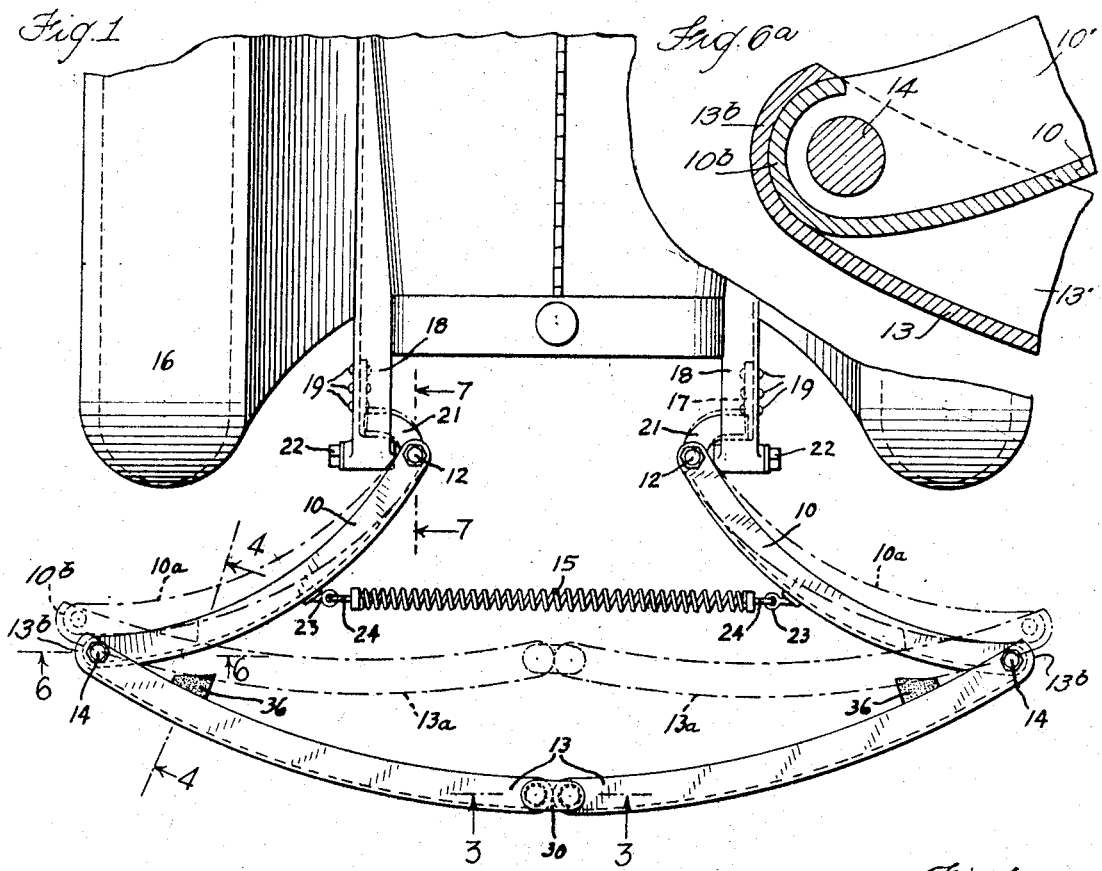
INVENTOR
Adolph A. Thomas Patented Mar. 8, 1932

1,848,851

UNITED STATES PATENT OFFICE

ADOLPH A. THOMAS, OF NEW YORK, N. Y.

VEHICLE BUMPER

Application filed April 12, 1930, Serial No. 443,661. Renewed June 15, 1931.

This invention is for an automobile bumper of novel construction in which an elastic element mounted transversely of the car expands under the force of the impact and thereby absorbs the effects of the shock. For this purpose I employ a pair of outwardly diverging levers pivoted to the chassis and connected by a tensioned coil spring or other elastic element. The outer ends of the levers are pivotally connected to the ends of a bumper bar which forms a toggle joint adapted to spread the diverging levers and thereby expand the spring when the bumper strikes an obstruction. In this way, the force of the impact is translated crosswise of the car to the tensioned spring, which by expanding absorbs the shock (in large part, at least), without transmitting it to the car.

My new shock-absorbing bumper comprises only a few rugged parts, which are cheap to make, easy to assemble, and combine to produce a pumper structure effective in operation and pleasing in appearance. The novel features and practical advantages of my invention will be understood from a description of the accompanying drawings in which—

Fig. 1 shows a preferred form of my new bumper attached to the front of an automobile;

Fig. 2 is a front elevation of a portion of the bumper;

Figs. 3, 4, 5, 6 and 7 are enlarged sections on lines 3—3 to 7—7, respectively, of Figs. 1 and 2;

Fig. 6a is an enlarged horizontal section through the nested end portions of the front and rear bumper bars;

Fig. 8 is a fragmentary detail view, partly in section, showing one way of connecting the spring to the toggle levers; and Fig. 9 is a section on line 9—9 of Fig. 8.

The bumper structure comprises a pair of outwardly diverging levers 10 pivoted to the car at 12, a bumper bar 13 in the form of a toggle joint pivotally connected at 14 to the outer ends of levers 10, and an expansible spring or other elastic element 15 connected at its ends to the levers. The parts 10 and 13 are preferably channel-shaped and may be made of duralumin or other metal which is light and strong. The diverging levers 10 may be shaped in a continuous curve to remain clear of the mud guards 16, and at the same time to improve the appearance of the bumper structure as a whole. The connected ends of rear bar 10 and front bar 13 are coiled into cylindrical form, as indicated at 10b and 13b, and the flanges 13' of bar 13 form top and bottom shoulders against which the coiled end portion of bar 10 abuts. This is clear from Fig. 6. The bolt 14 and nut 14' hold the cylindrical end portions 10b and 13b in nested relation. This novel end construction may be used in various kinds of bumpers.

The pivot supports 12 of levers 10 are shown as bolts passing through the horizontal flanges 10' of the levers and mounted in brackets 17, which are secured to the chassis extensions 18 by rivets 19 or otherwise. The supported end of each lever 10 carries a block 20 provided with an arm 21 which is adapted to engage the extensions 18 when the parts are in normal position. Referring to Fig. 7, it will be seen that the vertical pivot bolt 12 of each lever 10 passes through the hub portion 21' of arm 21, and this hub portion is welded to the underside of flange 10', or is otherwise rigidly attached to the lever. It might also be possible to make the arms 21 as integral extensions of levers 10. It is clear from Fig. 1 that the arms 21 constitute positive stops to limit the inward movement of levers 10 under the contracting action of the tensioned coil spring 15. As shown in Fig. 7, the block 20 may be secured to the underside of the upper flange 10' by welding, brazing, or in any other practical way. The supporting brackets 17 are mounted on cross-bolts 22 carried by the extensions 18. The bolts 22 may be formed as integral pins on brackets 17. It should be noted that the bolts 22 are not pivots for the levers 10, but act as rigid extensions for the brackets 17 which support the vertical pivot bolts 12. Since the brackets 17 are fixed, the levers 10 are held against vertical movement and can swing only in a horizontal direction about the vertical hinge bolts 12. Any other practical means may be employed for pivotally mounting the inner ends of levers 10 on the frame of the car.

The coil spring 15 is attached to the diverging levers 10 by two pairs of eyes 23 and hook 24. The eyes 23 are provided each with a bolt extension 25 adapted to receive a nut 26 for clamping the eye securely to the vertical wall of the channel lever 10, as clearly shown in Fig. 8. The hooks 24 which interlock with eyes 23 are attached to the ends of spring 15, as by inserting the ends 27 of the spring into cross slots 28 of blocks 29 to which the hooks 24 are connected. The particular form of connection between spring 15 and levers 10 is not material in the broader aspect of my invention.

The bumper bar 13 constitutes a toggle joint formed by a pair of members pivotally connected at their ends by a suitable hinge 30, which has a pair of bolts or pins 31 passing through the horizontal flanges of the channel-shaped bar, as best shown in Fig. 3. The projecting ends 32 of pins 31 are screwthreaded to receive nuts 33, and a clamping plate 34 may be interposed. The hinge pins 31 may carry spacing sleeves 35 arranged between the flanges of channel members 13, whereby the latter are firmly hinged together with ample bearing surface. The pivot connections 14 between bumper bar 13 and diverging levers 10 comprise bolts that pass through the overlapping flanges of the connected parts, as shown in Fig. 6, so as to form pivot joints capable of withstanding the impacts to which the structure may be subjected.

The bumper bar 13 projects outwardly at the center to such an extent that the hinged sections thereof form a toggle joint which tends to straighten under the force of an impact. That is to say, when the bumper bar strikes an obstruction, the hinged members 13 move inwardly at the center and thereby increase the distance between the pivots 14. Consequently, the pivoted levers 10 are spread apart, and the spring 15 is expanded. The dotted lines 10a and 13a indicate approximately the position that might be assumed by lever 10 and bar 13 when the bumper strikes an obstruction with a certain force. The practical advantage of this construction lies in the fact that the reaction due to the force of the impact is not transmitted directly to the car, but is absorbed (to a certain extent, at least) by the expansion of the transverse spring 15. Putting this differently, I might say that the force which strikes the bumper head-on is translated in a direction at right angles to the longitudinal axis of the car and transmitted along the axis of the transverse spring 15, which absorbs the shock by expansion.

The coil spring 15 may be replaced by any other practical form of elastic element, such as a bar of india rubber having the requisite strength and elasticity. The point of attachment of spring 15 to levers 10 is so chosen as to give the best results for any particular design of bumper structure. That is a matter which can easily be determined by actual experiment, or it may also be figured out by mathematics. The distance between the pivot points 14 at the outer ends of levers 10 should preferably be at least twice the distance between the inner pivots 12. In the particular construction illustrated in Fig. 1, the normal distance between pivots 14 is more than three times the distance between pivots 12, whereby the toggle bumper bar 13 is capable of exerting great leverage in expanding the tensioned spring 15 under the force of an impact. The toggle sections of bar 13 may be shaped to form a continuous curve to harmonize with the outwardly curving levers 10. It is evident, however, that the toggle members 13 may be straight and hinged together at the most efficient angle. The initial or normal tension of spring 15 will depend to some extent on the maximum force required to produce maximum expansion of the spring in any given case. I should say that in a bumper structure for use on passenger automobiles, the maximum expansion of spring 15 need not be more than from eight to twelve percent, but I mention these figures merely by way of illustration and not in a restrictive sense. The arc of maximum movement of levers 10 depends upon the normal angle of toggle-bars 13, or (to express it another way) upon the normal distance of hinge pins 31 from a line joining the outer pivots 14. These measurements are left to the skill of the experimenter.

To prevent the bumper toggle 13 from collapsing inwardly too far, I provide stop blocks 36, which may be attached either to the bumper bar or to levers 10. In the present instance these blocks are secured to the inside of channel members 13 near their outer ends. When the parts are in the dotted-line position indicated in Fig. 1, the blocks 36 strike the levers 10 and prevent the bumper members 13 from further inward movement relatively to the levers. The blocks 36 are preferably of shock-absorbing material, such as rubber, cork, and other non-metallic substances or compositions suitable for the purpose, but they can also be metal. To permit replacement of worn out blocks, I mount them in a holder 37 which has a removable wall 38 attached by screws or bolts 39. After a block 36 is inserted in holder 37, the plate 38 is put back in place, so that the block is securely gripped. The holders 37 may be so shaped as to bite into the material of the blocks and thereby prevent their slipping out or becoming loose. This will be clear from Fig. 5. Extensions 40 on holders 37 receive rivets 41 or other fastening devices to secure the holders to bumper bar 13.

It will be seen from the foregoing description that I have provided a bumper of simple rugged construction capable of absorbing or lessening the shocks due to collisions by translating the force of the impact in a direction crosswise of the car. My new bumper may be attached to the front and rear of any automotive vehicle. When I refer to automobiles in the claims, I use the term for convenience to indicate any type of self-propelled vehicle, whether passenger car, truck, bus, van, and so on. The coil spring 15 may be encased in a tube of elastic rubber and the like, or it may be completely hidden in a metal sheath. Ordinarily, however, the spring or other elastic element will be left exposed, because it is by no means unsightly, and it is supposed to be made of material not affected by atmospheric conditions.

Although I have shown and described a specific construction, I want it understood that my invention is not limited to the details set forth. As far as I know, I am the first to provide a bumper structure in which the impact bar is in the form of a toggle joint capable of expanding an elastic element to absorb the shock, and I therefore claim this feature in a fundamental way.

I claim as my invention:

1. A bumper structure for automobiles comprising a bumper bar which consists of a pair of toggle members projecting outwardly at the center of the bar and adapted to straighten under the force of an impact, and an elastic element arranged to be tensioned when said toggle members move inwardly.

2. A bumper structure for automobiles comprising a bumper bar curved outwardly at the center and formed of a pair of hinged toggle members adapted to straighten under the force of an impact, a tensioned spring arranged crosswise of the car, and connections whereby the straightening of said toggle members expands the spring.

3. A bumper structure for automobiles comprising an impact member in the form of two articulated bars projecting outwardly at the center to constitute a toggle, said toggle bars tending to straighten under the force of an impact, an elastic element arranged crosswise of the car, and connections whereby the straightening of said toggle bars expands said element.

4. A bumper structure for automobiles comprising a bumper bar curved outwardly at the center and formed of a pair of curved channel members hinged together at their inner ends to form a toggle joint, said outwardly curved members being adapted to straighten under the force of an impact, and an elastic element arranged to be tensioned when said toggle members move inwardly.

5. A bumper structure for automobiles comprising two pairs of connected levers, an elastic element arranged crosswise of the car and connected to two of said levers, the other two levers forming a toggle joint and constituting a bumper bar, said toggle joint tending to straighten under the force of an impact to move said first-mentioned pair of levers apart and thereby expand said elastic element.

6. A bumper structure for automobiles comprising a pair of outwardly diverging levers pivoted to the car, a tensioned elastic element connected to said levers between the ends thereof and extending crosswise of the car, and a bumper bar projecting outwardly at the center and connected at its ends to the outer ends of said levers, said bumper bar being collapsible at the center to spread the diverging levers and thereby expand said elastic element.

7. A bumper structure for automobiles comprising a pair of levers pivoted at their inner ends to the car, said levers diverging outwardly in a substantially continuous curve, a tensioned elastic element arranged crosswise of the car and connected to said levers, and an outwardly curved bumper bar hinged at its ends to the outer ends of said levers, said bumper bar consisting of a pair of curved toggle members adapted to straighten under the force of an impact and thereby expand said elastic element.

8. A bumper structure for automobiles comprising a pair of outwardly diverging levers pivoted to the car, a tensioned elastic element connected to said levers between the ends thereof and extending crosswise of the car, a bumper bar comprising two sections pivotally connected and projecting outwardly at the center of the bar, and means for pivotally connecting the outer ends of said bar to the outer ends of said levers, said bumper sections moving inwardly at the center under the force of an impact to spread the diverging levers and thereby expand said elastic element.

9. A bumper structure for automobiles comprising a pair of channel-shaped levers pivoted to the car and diverging outwardly, a tensioned elastic element arranged crosswise of the car and connected to said levers, and an outwardly curved bumper bar connected at its ends to the outer ends of said levers, said bumper bar comprising a pair of curved channel member hinged together at their inner ends to form a toggle joint, said toggle members being adapted to straighten under the force of an impact and spread the diverging levers, whereby said elastic element is expanded.

10. A bumper structure for automobiles comprising a pair of rigid levers pivoted at the inner ends to the car and diverging outwardly in a substantially continuous curve, the distance between the outer ends of said levers being at least twice the distance between the inner pivoted ends, a tensioned elastic element connected to said levers between their ends and extending crosswise of the car, and a bumper element connected to said levers for spreading the same under the force of an impact and thereby expanding said elastic element.

11. A bumper structure for automobiles comprising a pair of rigid levers pivoted at their inner ends to the car and diverging outwardly in a substantially continuous curve, the distance between the outer ends of said levers being more than twice the distance between the inner pivoted ends, a tensioned elastic element connected to said levers about midway of their ends, and an outwardly curved bumper bar connected at its ends to the outer ends of said levers, said bumper comprising a toggle joint adapted to spread the levers under the force of an impact and thereby expand said elastic element.

12. A bumper structure for automobiles comprising a pair of outwardly diverging levers pivoted to the car, a tensioned elastic element connected to said levers between the ends thereof and extending crosswise of the car, a bumper bar projecting outwardly at the center and connected at its ends to the outer ends of said levers, said bumper bar being collapsible at the center to spread the diverging levers and thereby expand said elastic element, and means for limiting the inward movement of said levers under the contracting action of said element.

13. An automobile having two extensions on the chassis arranged between a pair of mud guards, two rigid levers pivotally mounted at their inner ends on said extensions and diverging outwardly in a substantially continuous curve, the outer ends of said levers being approximately in line with the outer ends of the mud guards, a tensioned elastic element connected to said levers between their ends and extending crosswise of the car, and a bumper bar connected to said levers for spreading the same under the force of an impact and thereby expanding said elastic element.

14. A bumper structure for automobiles comprising a pair of outwardly diverging levers pivoted to the car, a tensioned elastic element connected to said levers between the ends thereof and extending crosswise of the car, a bumper bar projecting outwardly at the center and connected at its ends to the outer ends of said levers, said bumper bar being collapsible at the center to spread the diverging levers and thereby expand said elastic element, and extensions on said levers arranged to engage the car for limiting the inward movement of said levers under the contracting action of said element.

15. A bumper structure for automobiles comprising a pair of outwardly diverging levers pivoted to the car, a tensioned elastic element connected to said lever between the ends thereof and extending crosswise of the car, a bumper bar comprising two sections pivotally connected and projecting outwardly at the center of the bar, means for pivotally connecting the outer ends of said bar to the outer ends of said levers, said bumper sections moving inwardly at the center under the force of an impact to spread the diverging levers and thereby expand said elastic element, and means for limiting the inward movement of said bumper sections relatively to said levers.

16. A bumper structure for automobiles comprising an outwardly curved bumper bar composed of two channel-shaped members and an intermediate hinge for connecting said members, said hinge having a pair of spaced parallel bolts which pass through the flanges of the adjacent ends of said members, a pair of outwardly diverging levers connected at their inner ends to the car, a tensioned elastic element connected to said levers and arranged crosswise of the car, and means for connecting said bumper bar to said levers to spread the same when the hinged ends of the bar move inwardly under the force of an impact, whereby said elastic element is expanded to take up the shock.

17. A bumper structure for automobiles comprising a pair of outwardly diverging levers pivoted to the car, a tensioned elastic element connected to said levers between the ends thereof and extending crosswise of the car, a bumper bar comprising two sections pivotally connected and projecting outwardly at the center of the bar, means for pivotally connecting the outer ends of said bar to the outer ends of said levers, said bumper sections moving inwardly at the center under the force of an impact to spread the diverging levers and thereby expand said elastic element, and elastic blocks arranged between said levers and bumper sections to prevent the latter from moving too far inwardly at the center.

18. A bumper structure for automobiles comprising a pair of outwardly diverging levers in the form of channel irons, a pair of spaced brackets secured to the chassis of the car, vertical pins mounted in said brackets and passing through the flanges of said levers, a tensioned elastic element connected to said levers and extending crosswise of the car, an extension secured to the inner end of each lever and arranged to engage the chassis, whereby said extensions form stops for the inward movement of said levers under the contracting action of said elastic element, and a bumper bar connected to the outer ends of said levers for spreading the same under the force of an impact and expanding said elastic element.

19. A bumper structure for automobiles comprising a pair of outwardly diverging levers in the form of channel pieces, a pair of spaced brackets secured to the chassis of the car, vertical pins mounted in said brackets and passing through the flanges of said levers, a tensioned elastic element connected to said levers and extending crosswise of the car, an extension secured to the inner end of each lever and arranged to engage the chassis, whereby said extensions form stops for the inward movement of said levers under the contracting action of said elastic element, and a bumper bar connected to the outer ends of said levers, said bumper bar comprising a pair of toggle members for spreading said levers under the force of an impact and expanding said elastic element.

20. A bumper structure for automobiles comprising a pair of outwardly diverging levers pivoted to the car, a tensioned elastic element connected to said levers between the ends thereof and extending crosswise of the car, a bumper bar comprising a pair of hinged channel members projecting outwardly at the center of the bar, the outer ends of said members being connected to the outer ends of said levers, said members moving inwardly at the projecting hinge connection under the force of an impact to spread the diverging levers and thereby expand said elastic element, and a pair of elastic blocks secured to the inside of said channel members near their outer ends and projecting toward said levers, said blocks being adapted to engage said levers and limit the inward movement of said bumper members.

21. A bumper structure having an impact element comprising toggle means adapted to expand horizontally, and elastic means arranged to be tensioned by the expansion of said toggle means.

22. A bumper structure for vehicles comprising an impact element normally projecting forwardly at the center and tending to straighten under the force of an impact, whereby the normal distance between the ends of said element increases, and elastic means arranged to be tensioned transversely of the vehicle by the straightening movement of said element.

23. A bumper structure for vehicles comprising a pair of movable members connected at their inner ends to the body of a vehicle and diverging at their outer ends, and a bumper element connected at its ends to the outer ends of said members, said bumper element projecting forwardly at the center and tending to straighten under the force of an impact, whereby the normal distance between the ends of said members increases and causes spreading of said diverging members.

24. In a bumper end construction, a front bar having a cylindrical end portion provided with spaced flanges, a rear bar having a cylindrical end portion nesting within said first named cylindrical portion, which has a greater diameter than the end portion of the rear bar for surrounding and enclosing said rear end portion, and means for maintaining said cylindrical end portions in operative relation.

25. In a bumper end construction, a front bar having a cylindrical end portion provided with spaced flanges, a rear bar having a cylindrical end portion nesting within said first named cylindrical portion, which has a solid wall bent rearwardly to surround and enclose the cylindrical end portion of the rear bar, and a bolt passing through said nested end portions for holding them together.

ADOLPH A. THOMAS.